(12) United States Patent
Kwak et al.

(10) Patent No.: US 9,397,320 B2
(45) Date of Patent: Jul. 19, 2016

(54) BATTERY PACK

(75) Inventors: Eun-Ok Kwak, Yongin-si (KR);
Kyung-Won Seo, Yongin-si (KR);
Jeong-Deok Byun, Yongin-si (KR);
Byoung-Ju Kim, Yongin-si (KR);
Jong-Wook Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 618 days.

(21) Appl. No.: 13/312,971

(22) Filed: Dec. 6, 2011

(65) Prior Publication Data

US 2012/0237815 A1 Sep. 20, 2012

Related U.S. Application Data

(60) Provisional application No. 61/452,503, filed on Mar. 14, 2011.

(51) Int. Cl.
| | |
|---|---|
| *H01M 10/50* | (2006.01) |
| *H01M 2/02* | (2006.01) |
| *H01M 2/04* | (2006.01) |
| *H01M 10/647* | (2014.01) |
| *H01M 10/6551* | (2014.01) |
| *H01M 10/613* | (2014.01) |

(52) U.S. Cl.
CPC ............ *H01M 2/0277* (2013.01); *H01M 2/024* (2013.01); *H01M 2/0207* (2013.01); *H01M 2/0285* (2013.01); *H01M 2/0439* (2013.01); *H01M 10/613* (2015.04); *H01M 10/647* (2015.04); *H01M 10/6551* (2015.04)

(58) Field of Classification Search
None
See application file for complete search history.

(56) References Cited

U.S. PATENT DOCUMENTS

2006/0286450 A1 12/2006 Yoon et al.
2011/0027630 A1* 2/2011 Tsutsumi et al. ............... 429/53

FOREIGN PATENT DOCUMENTS

| DE | 20 2009 001 282 U1 | 8/2010 |
|---|---|---|
| EP | 1 717 882 A1 | 11/2006 |
| EP | 1 804 328 A1 | 7/2007 |
| JP | 05-303977 | 11/1993 |
| JP | 2001-126677 | 5/2001 |
| JP | 3109798 | 4/2005 |
| KR | 10-2006-0126106 | 12/2006 |

OTHER PUBLICATIONS

English abstract corresponding to DE 20 2009 001 282 U1, published Aug. 19, 2010 in the name of VARTA Microbiology GmbH, previously cited on Jul. 25, 2012 (1 page).
Extended European Search Report dated Jul. 3, 2012 for EP 12150339.5 (7 pages ).
SIPO Office action dated Apr. 3, 2015, with English translation, for corresponding Chinese Patent application 201210067300.2, (19 pages).
Machine translation of JP-05-303977, pp. 11, 2005.
Machine translation of JP-2001-126677, pp. 16, 2001.
SIPO Office action dated Dec. 15, 2015, with English translation, for corresponding Chinese Patent application 201210067300.2, (8 pages).
KIPO Office action dated Mar. 4, 2016, for corresponding to Korean Patent application 10-2012-0024111, (6 pages).

* cited by examiner

*Primary Examiner* — Ladan Mohaddes
(74) *Attorney, Agent, or Firm* — Lewis Roca Rothgerber Christie LLP (57) ABSTRACT

A case for a battery cell includes a heat radiation unit, a terminal unit, and an insulating frame interlocked with the heat radiation unit and the terminal unit to form the case. The heat radiation unit and the terminal unit are integrated by the insulating frame so that it is possible to prevent the heat radiation unit or the terminal unit from being separated from the case.

13 Claims, 7 Drawing Sheets

BATTERY PACK

CROSS-REFERENCE TO RELATED APPLICATION

This application claims priority to and the benefit of U.S. Provisional Application No. 61/452,503, filed on Mar. 14, 2011, in the United States Patent and Trademark Office, the content of which is incorporated herein by reference.

BACKGROUND

1. Field

Aspects of one or more embodiments of the present invention relate to a battery pack.

2. Description of the Related Art

Secondary batteries are used in various technology fields covering many industry areas. Secondary batteries are widely used as an energy source of mobile electronic devices such as digital cameras, mobile phones, notebook computers, and the like, and are also applicable as an energy source for hybrid electric automobiles, which are being proposed as a solution to reduce air pollution caused by gasoline and diesel internal combustion engines using fossil fuel, and as an energy storage system for household or industrial use. A secondary battery may be packaged by being housed in a pack case and then may be used in the form of a battery pack. Here, as an example, the battery pack is coupled to a motor for propelling an electric vehicle or a hybrid electric vehicle.

SUMMARY

Aspects of embodiments according to the present invention are directed toward a case for a battery call. The case includes a heat radiation unit and a terminal unit that are integrated by an insulating frame so that it is possible to prevent the heat radiation unit or the terminal unit from being separated from the case. The case is adapted to diffuse heat generated in the battery cell, to prevent a false insertion of the battery cell when the battery cell is disposed on the case, and to provide a space that accommodates a swelling phenomenon of the battery cell during charging or discharging. As such, for example, an electric vehicle or a hybrid electric vehicle including a battery pack formed with the embodied case is safer to drive.

According to an embodiment, a case for a battery cell includes a heat radiation unit, a terminal unit, and an insulating frame interlocked with the heat radiation unit and the terminal unit to form the case.

The terminal unit may have a hole, and a part of the insulating frame is within the hole to interlock the insulating frame with the terminal unit.

The hole of the terminal unit may have a first portion and a second portion that is narrower than the first portion.

The part of the insulating frame at the first portion of the hole may be wider than the second portion of the hole.

The insulating frame may have a main body, and the part of the insulating frame at the second portion of the hole is between the main body and the part of the insulating frame at the first portion of the hole.

A side of the terminal unit may include a projection portion at least partially received in a receiving portion of the insulating frame. The projection portion may have a saw-toothed pattern. A shape of the receiving portion of the insulating frame may substantially conform to the projection portion.

A difference in height between the heat radiation unit and the insulating frame may form a space between the case and another battery case stacked adjacent to the case.

The insulating frame may have a first height, and the heat radiation unit may have a second height less than the first height.

The case may further include an adhering member between the heat radiation unit and the battery cell.

The heat radiation unit may have a plurality of holes for diffusing heat from the battery cell. The heat radiation unit may have a hole, and a part of the insulating frame is within the hole to interlock the heat radiation unit with the insulating frame.

The case may further include a spacer interlocked with a side of the heat radiation unit opposite another side of the heat radiation unit connected to the insulating frame, wherein the spacer has a first height and the heat radiation unit has a second height less than the first height.

According to another embodiment, a battery pack includes a heat radiation unit, first and second terminal units, and an insulating frame interlocked with the heat radiation unit and both the first and second terminal units to form a case. A battery cell is in the case and includes first and second lead tabs electrically coupled to the first and second terminal units, respectively. The first and second lead tabs have shapes respectively conforming to shapes of the first and second terminal units.

The battery pack may further include a conductive plate. Each of the first and second terminal units may include a main body and a ridge, and the first and second lead tabs may be between the conductive plate and main body.

The battery pack may further include a screw inserted through the conductive plate, a corresponding one of the first and second terminal units, and a corresponding one of the first and second lead tabs.

Each of the first and second terminal units may have a hole having a first portion and a second portion that is narrower than the first portion, and a part of the insulating frame may protrude from a main body of the insulating frame proximate to the second portion of the hole and may extend to the first portion of the hole. The part of the insulating frame at the first portion is wider than the second portion of the hole.

The heat radiation unit may be oxidized.

According to another embodiment, a method is provided for manufacturing a case for a battery. The method includes fixing a heat radiation unit and a terminal unit inside a mold, injecting an insulating material inside the mold, and hardening the insulating material to form an insulating frame interlocked with the heat radiation unit and the terminal unit to form the case.

DETAILED DESCRIPTION OF EMBODIMENTS

Reference will now be made in detail to embodiments, examples of which are illustrated in the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will be defined by the appended claims. Throughout the specification, a singular form may include plural forms, unless there is a particular description contrary thereto. Also, terms such as "comprise" or "comprising" are used to specify existence of a recited form, a number, a process, an operation, a component, and/or groups thereof, not excluding the existence of one or more other recited forms, one or more other numbers, one or more other processes, one or more other operations, one or more other components, and/or groups thereof. While terms such as "first" and "second" are used to describe various components, the components are not limited to the terms "first" and "second". The terms "first" and "second" are used only to distinguish between components.

Figure 1:
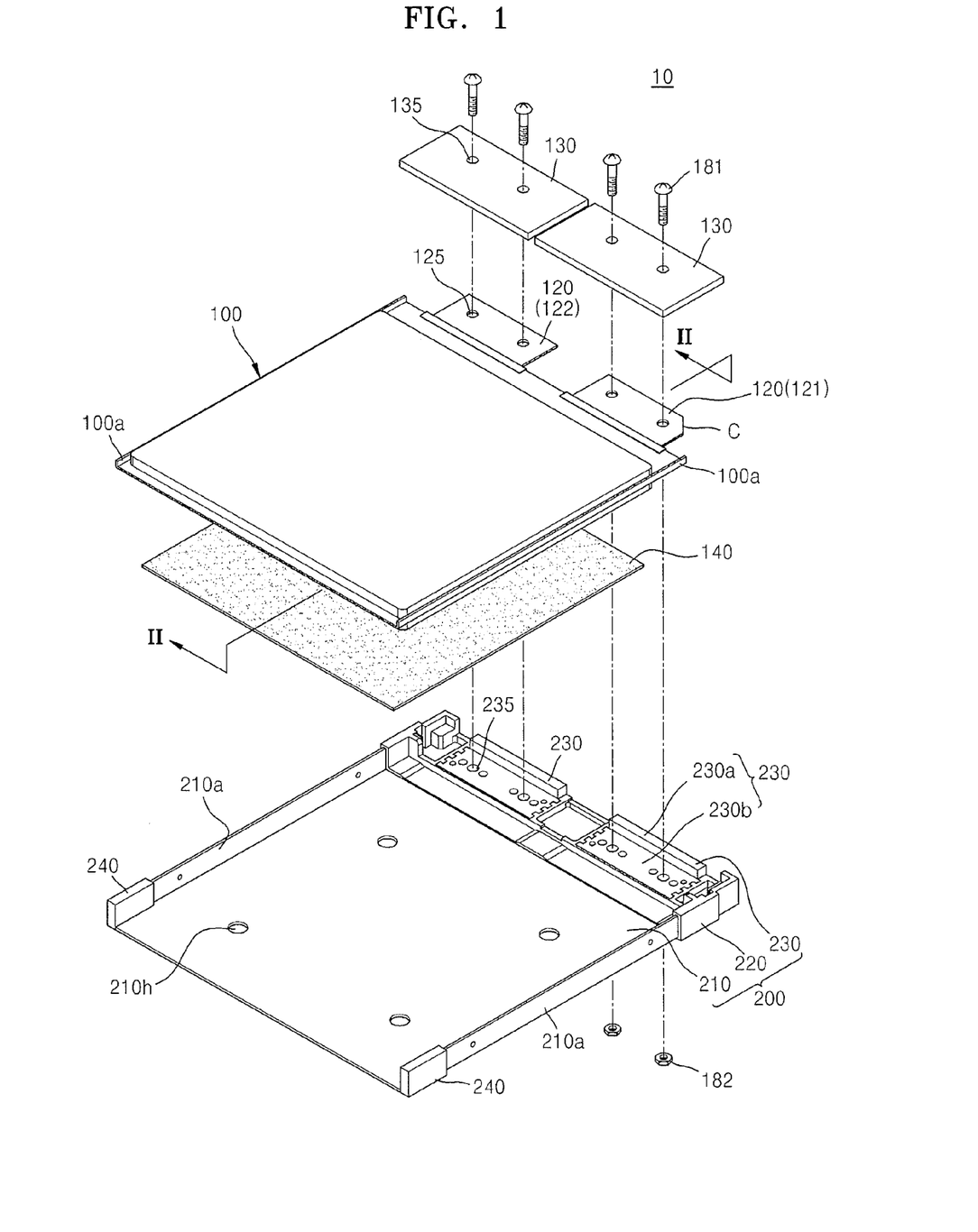
FIG. 1 is an exploded perspective view of a battery pack according to an embodiment of the present invention.
Figure 2:
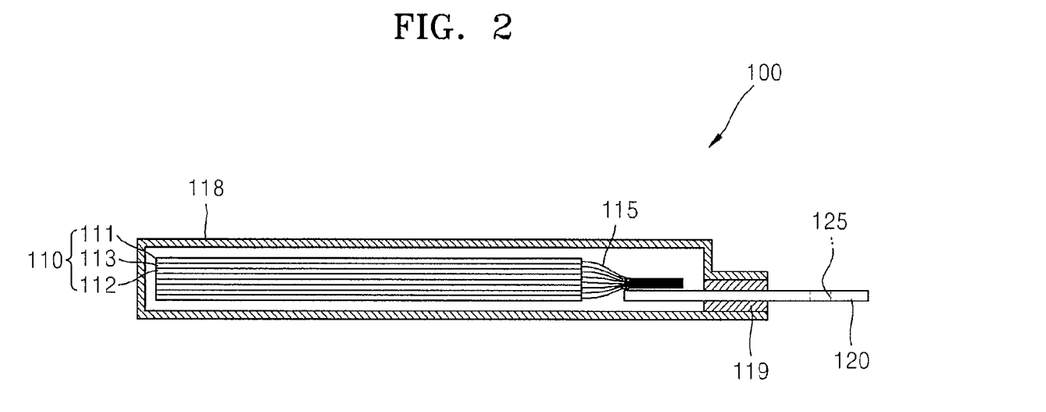
FIG. 2 is a cross-sectional view of the battery pack of FIG. 1, taken along the line II-II.
Figure 3:
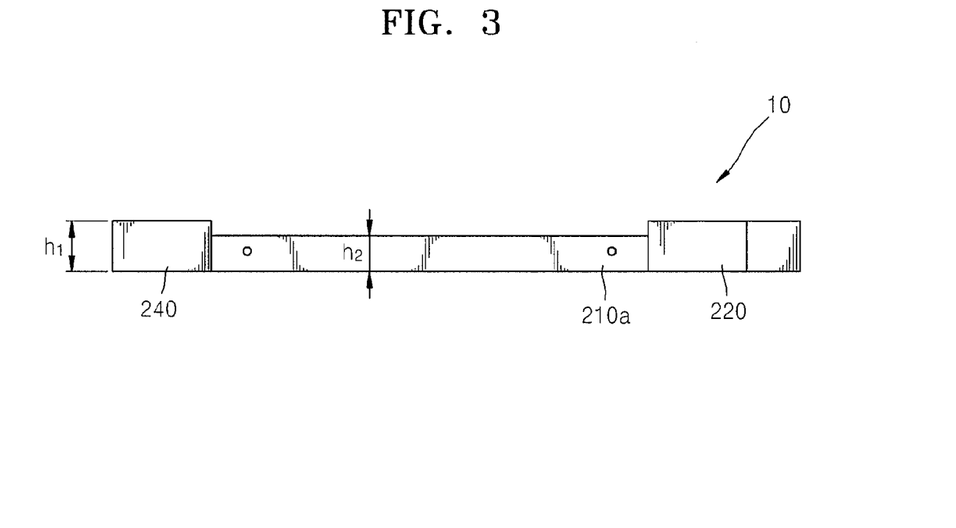
FIG. 3 is a side view of the battery pack of FIG. 1.
Figure 4:
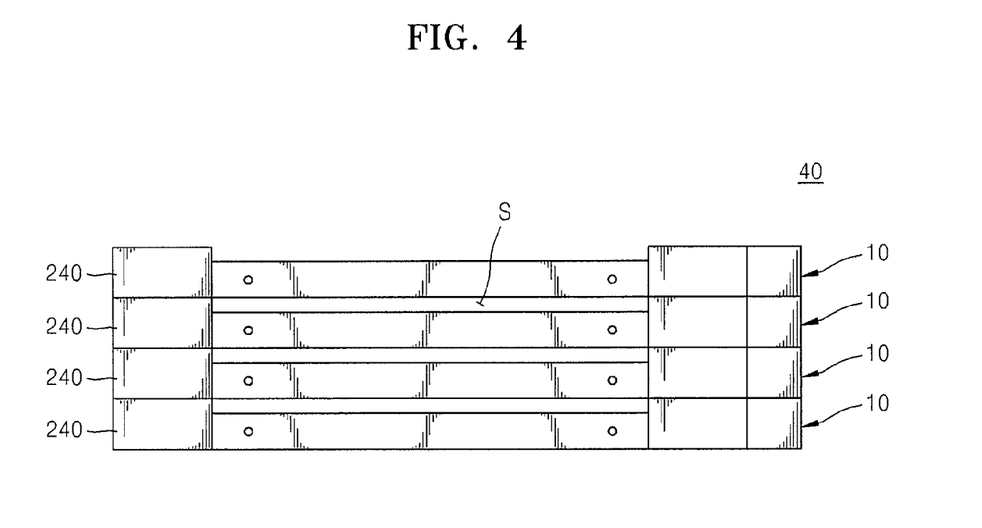
FIG. 4 is a side view illustrating a battery module obtained by electrically connecting a plurality of the battery packs of FIG. 1.

FIG. 1 is an exploded perspective view of a battery pack 10 according to an embodiment of the present invention. FIG. 2 is a cross-sectional view of the battery pack 10, taken along the line II-II. FIG. 3 is a side view of the battery pack 10. FIG. 4 is a side view illustrating a battery module obtained by electrically connecting a plurality of the battery packs 10.

Referring to FIG. 1, the battery pack 10 includes a battery cell 100 and a case 200 for housing the battery cell 100.

The battery cell 100 is a secondary battery capable of being charged and discharged, and the battery cell 100 may be, for example, a lithium-ion battery. The battery cell 100 includes an electrode assembly 110 (shown in FIG. 2) and a lead tab 120 that is electrically connected with the electrode assembly 110.

Referring to FIG. 2, the battery cell 100 may include the electrode assembly 110, which is formed by sequentially stacking a positive electrode plate 111, a separator 113, and a negative electrode plate 112. In order to provide the battery pack 10 having a high output power and a high capacity, a plurality of the positive electrode plates 111, a plurality of the separators 113, and a plurality of the negative electrode plates 112 may be stacked. The electrode assembly 110 is encapsulated in a pouch 118. Although not illustrated in the drawings, the positive electrode plate 111 may be formed by coating a positive active material on a surface of a positive electrode current collector, and the negative electrode plate 112 may be formed by coating a negative active material on a surface of a negative electrode current collector.

Electrode tabs 115 may be electrically connected to the positive electrode plate 111 and the negative electrode plate 112, respectively. The electrode tabs 115, which extend from the positive electrode plate 111 and the negative electrode plate 112, are overlapped with each other, and the overlapped electrode tabs 115 are electrically connected with the lead tab 120. For example, the electrode tabs 115 and the lead tab 120 may be coupled by ultrasonic welding.

The lead tab 120 forms an interconnection with an element outside of the battery cell 100, and extends from a side of the battery cell 100 so as to carry a current between the battery cell 100 and the outer element. For example, a portion of the lead tab 120 is exposed outside of the pouch 118, and an insulating member 119 may be interposed between the lead tab 120 and the pouch 118 to insulate therebetween. The lead tab 120 may include a first lead tab 121 and a second lead tab 122 having different polarities. The first lead tab 121 may be electrically connected with the positive electrode plate 111 of the electrode assembly 110, and the second lead tab 122 may be electrically connected with the negative electrode plate 112.

Referring back to FIG. 1, a coupling hole 125 may be formed in the lead tab 120 in order to electrically connect the lead tab 120 with a conductive plate 130. The coupling hole 125 may be formed in the lead tab 120 at a position separate from side ends of the lead tab 120 by a set or predetermined distance. For example, a pair of the coupling holes 125 may be formed in the lead tab 120 at positions separate from the side ends of the lead tab 120.

The lead tab 120 may be formed of a metal material having a suitably high conductivity. For example, the lead tab 120 may include a metal material such as nickel-aluminum, copper, or the like. The first lead tab 121 and the second lead tab 122 may be formed of different materials. For example, the first lead tab 121 may include aluminum, and the second lead tab 122 may include copper, nickel, or an alloy of copper and nickel.

The battery cell 100 may be electrically connected with an external load or an external power supply device via the lead tab 120. For example, the battery cell 100 may output a discharging current to the external load via the lead tab 120, or the battery cell 100 may receive a charging current from the external power supply device via the lead tab 120.

The battery cell 100 is assembled on the case 200 and is supported by the case 200. An adhering member 140 such as an insulating tape may be interposed between the battery cell 100 and the case 200 so as to fix a position of the battery cell 100. In order to prevent a mis-insertion of the battery cell 100 when the battery cell 100 is disposed on the case 200, a corner C of the first lead tab 121 from among the first and second lead tabs 121 and 122 may be partially cut.

The case 200 includes a heat radiation unit 210 that houses the battery cell 100 and radiates heat generated by the battery cell 100; a terminal unit 230 that is electrically connected with the lead tab 120 extending from a side of the battery cell 100; and an insulating frame 220 that integrally couples the heat radiation unit 210 and the terminal unit 230. That is, the insulating frame 220 is interlocked with the heat radiation unit 210 and the terminal unit 230 in order to form the case 200. The terminal unit 230 has a main body 230b and a ridge 230a. The ridge 230a may have a height that is substantially the same as a thickness of the lead tab 120 such that when the lead tab 120 is electrically connected with the terminal unit 230, an edge of the lead tab 120 is covered by the ridge 230a.

The heat radiation unit 210 protects the battery cell 100 against an external shock, and functions as a heat radiation plate that thermally contacts the battery cell 100 so as to externally radiate heat that is generated when the battery cell 100 is charged and discharged. The heat radiation unit 210 may include a material having a suitable or high mechanical rigidity and a suitable or high thermal conductivity. For example, the heat radiation unit 210 may include an aluminum material.

The heat radiation unit 210 may have a completely or substantially flat plate shape and may include a rib 210a that is formed by bending each side end of the heat radiation unit 210 to enclose the battery cell 100. For example, a height of the rib 210a may be equal to or greater than a thickness of the battery cell 100. Since the heat radiation unit 210 has a structure completely or substantially enclosing the battery cell 100, the heat radiation unit 210 may protect the battery cell 100 having a relatively low rigidity and may electrically insulate the battery cell 100 from an external environment. A spacer 240 may be formed on the rib 210a. The spacer 240 may be formed together with the insulating frame 220 when the case 200 is injection-molded. For example, the rib 210a may be formed between the heat radiation unit 210 and the spacer 240 that are formed of different materials. That is, the heat radiation unit 210 is formed of a metal material, and the spacer 240 is formed of a resin material by injection molding. In another embodiment, separately from the forming of the insulating frame 220, the spacer 240 may be formed when the heat radiation unit 210 is manufactured. For example, the spacer 240 may be integrally or concurrently formed with the radiation unit 210.

The spacer 240 and the insulating frame 220 may include an insulating resin material. For example, the spacer 240 may be formed of a polymer resin material including Poly-Phenylene Sulfide (PPS) and a glass fiber (GF).

Referring to FIG. 3, a height h1 of the spacer 240 may be greater than a height h2 of the rib 210a. As illustrated in FIG. 4, a battery module 40 includes a plurality of the battery packs 10 that are electrically connected. Here, the height h1 of the spacer 240 may be greater than the height h2 of the rib 210a so as to obtain a space S between the adjacent battery packs 10 in a stacking direction. The height h1 of the spacer 240 may be equal to a height of the insulating frame 220 so that the plurality of the battery packs 10 may be stably stacked in the stacking direction.

In order to provide the battery module 40 having a high output power and a high capacity, the battery cells 100, each supported by the case 200, are evenly stacked, and the battery cells 100, each acting as a unit, are electrically connected in series or in parallel. Here, the space S, which is formed in the stacking direction, may accommodate a swelling phenomenon of the battery cell 100 that may occur during the charging and discharging operations of the battery cell 100, and since heat of the battery cell 100 is exhausted via the space S, heat dissipation or radiation of the battery cell 100 may be promoted.

The heat radiation unit 210 may have an insulation film formed on an external surface of the heat radiation unit 210 so as to be electrically insulated from the battery cell 100. Therefore, the heat radiation unit 210 does not interfere with the charging and discharging operations of the battery cell 100 while the heat radiation unit 210 promotes heat dissipation or radiation by thermally contacting the battery cell 100. For example, the heat radiation unit 210 may be formed of an aluminum material, whereas the external surface of the heat radiation unit 210 may be formed of an aluminum oxidation layer via an anodizing process. Also, side surfaces 100a of the battery cell 100 may be enclosed by an insulation tape to be electrically insulated from the rib 210a of the heat radiation unit 210.

Through holes 210h may be formed in the heat radiation unit 210. The battery cell 100 may be exposed to low temperature air via the through holes 210h, and the low temperature air may efficiently diffuse heat generated in the battery cell 100. The through holes 210h may be used to fix a position of the heat radiation unit 210, e.g., in a mold, when the heat radiation unit 210 and the terminal unit 230 are integrally coupled by using the insulating frame 220, which is injection-molded in the mold. A state in which the heat radiation unit 210 is fixed to the mold by using the through holes 210h will be described with reference to FIG. 11 in more detail.

The terminal unit 230 is arranged at a position corresponding to the lead tab 120 of the battery cell 100 and thus is electrically connected with the lead tab 120. A current generated at the battery cell 100 may pass through the lead tab 120 and then may flow to the outside of the battery pack 10 via the terminal unit 230 that is electrically connected with the lead tab 120.

The terminal unit 230 is overlapped with the lead tab 120 while being in contact with the lead tab 120, and is coupled with the lead tab 120 by coupling members 181 and 182. Coupling holes 235 may be formed in the terminal unit 230 so as to correspond to the coupling holes 125 of the lead tab 120. While the terminal unit 230 and the lead tab 120 are disposed to overlap with each other, the terminal unit 230 and the lead tab 120 may be coupled with each other by having the coupling members 181 inserted into the coupling holes 235 of the terminal unit 230 and the coupling holes 125 of the lead tab 120. Then the terminal unit 230 and the lead tab 120 are assembled together.

The terminal unit 230 may have a rectangular metal block shape and may include a metal material such as copper having a suitable or high conductivity. Also, the terminal unit 230 may include a metal material such as nickel, copper, aluminum, or the like.

The terminal unit 230 is integrally coupled with the heat radiation unit 210 via the insulating frame 220. The insulating frame 220 may include an insulating resin material. The insulating frame 220 may include a polymer resin material including Poly-Phenylene Sulfide (PPS) and a glass fiber (GF). The insulating frame 220 may be injection-molded, and by performing injection molding between different material types, it is possible to obtain the case 200, which is a combination of the terminal unit 230 and the heat radiation unit 210 formed of a metal material, and the insulating frame 220 formed of a resin material. In order to prevent the terminal unit 230 from being separated from the case 200 that is formed by performing injection molding between different material types, the terminal unit 230 may have a separation-resistant structure.

Figure 5:
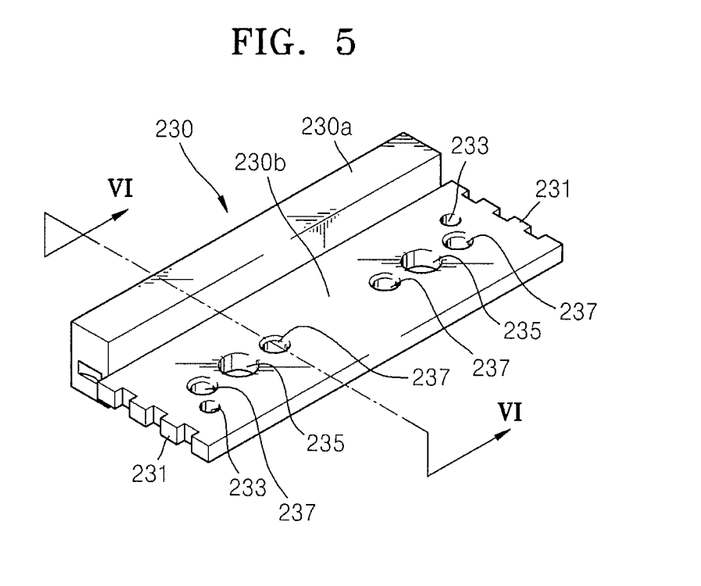
FIG. 5 is a perspective view of a terminal unit of the battery pack of FIG. 1.
Figure 6:
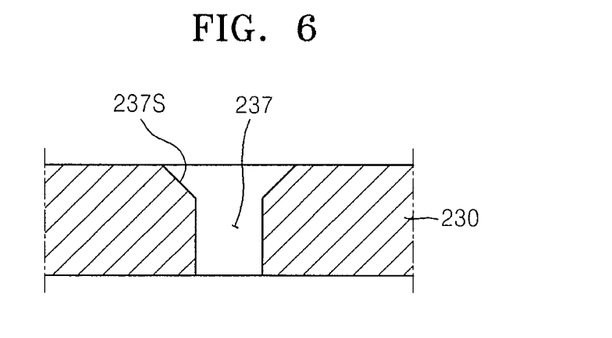
FIG. 6 is a cross-sectional view of the terminal unit of FIG. 5, taken along the line VI-VI.
Figure 7:
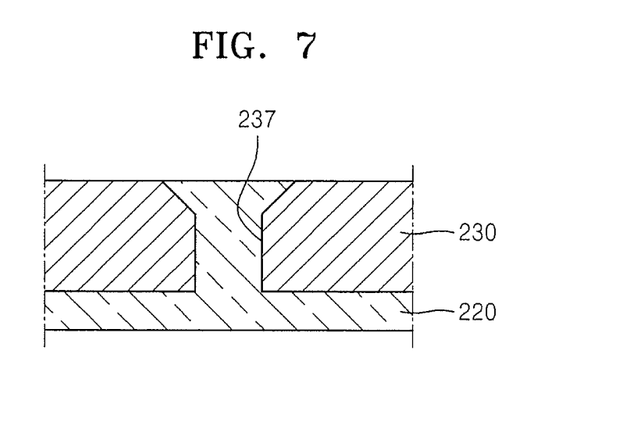
FIG. 7 is a cross-sectional view illustrating a connection state between the terminal unit of FIG. 5 and an insulating frame.

FIG. 5 is a perspective view of the terminal unit 230 of the battery pack 10. FIG. 6 is a cross-sectional view of the terminal unit 230, taken along the line VI-VI. FIG. 7 is a cross-sectional view illustrating a connection state between the terminal unit 230 and the insulating frame 220.

Referring to FIG. 5, the terminal unit 230 has the coupling holes 235 through which the coupling members 181 are inserted, a projection portion 231, and a first burying hole 237 (e.g., a countersink hole) that acts as a separation-resistant structure to prevent the terminal unit 230 from being separated from the insulating frame 220. Also, the terminal unit 230 may include a rotation-resistant hole 233 that fixes a position of the terminal unit 230 when the insulating frame 220 is injection-molded.

The rotation-resistant-hole 233 may be arranged at an upper right portion and a lower left portion of the terminal unit 230 so as to fix the position of the terminal unit 230 when the insulating frame 220 is injection-molded and to also (e.g., simultaneously) prevent rotation of the terminal unit 230. Also, the rotation-resistant hole 233 may be arranged at an upper left portion and a lower right portion so as to be positioned in another diagonal direction of the terminal unit 230.

The projection portion 231 may be arranged at side surfaces of the terminal unit 230 so as to increase a coupling strength between the terminal unit 230 and the insulating frame 220 that is injection-molded by using an insulating resin material. Due to the projection portion 231, the side surfaces of the terminal unit 230 have a saw-toothed pattern. The insulating frame 220 is integrated (or interlocked) with the terminal unit 230 when the insulating resin material injected during an injection molding process of the insulating frame 220 is hardened. The saw-toothed pattern formed by the projection portion 231 of the terminal unit 230 reinforces a coupling strength between the insulating frame 220 and the terminal unit 230.

Referring to FIGS. 5 and 6, the first burying hole 237 may be formed in the terminal unit 230 for firmly coupling the terminal unit 230 with the insulating frame 220 that is injection-molded by using the insulating resin material.

In order to prevent or protect the terminal unit 230 from being separated from the insulating frame 220 after the insulating resin material is hardened, a portion of the first burying hole 237 may have inclined surfaces 237S. Here, the first burying hole 237 may have a Y-shaped cross section. Referring to FIG. 7, even if an external shock or force is applied to the insulating frame 220 and the terminal unit 230, or a force is applied to pull the terminal unit 230 from the insulating frame 220, the terminal unit 230 may not be easily separated from the insulating frame 220 due to portions of the insulating frame 220 on the inclined surfaces 237S of the first burying hole 237.

Figure 8:
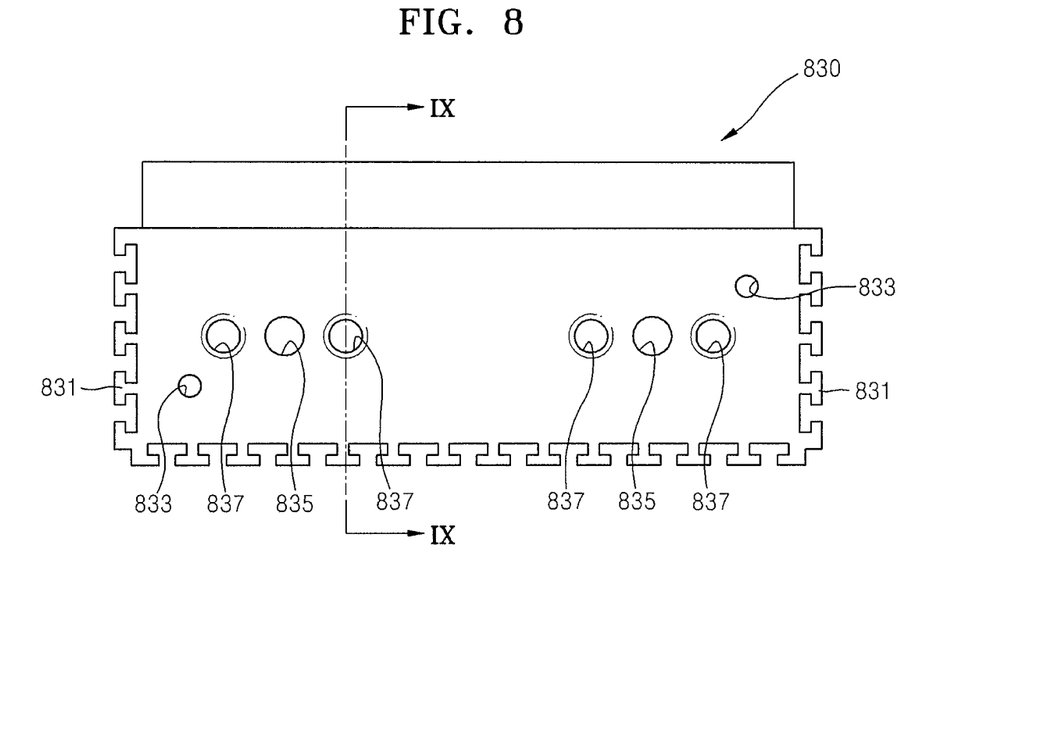
FIG. 8 is a plan view illustrating an upper portion of a terminal unit according to another embodiment of the present invention.
Figure 9:
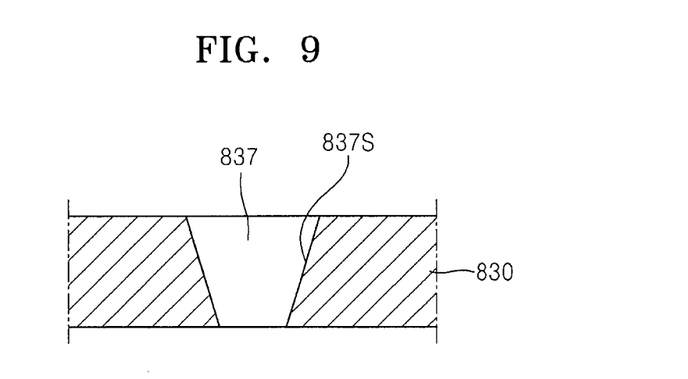
FIG. 9 is a cross-sectional view of the terminal unit of FIG. 8, taken along the line IX-IX.

FIG. 8 is a plan view illustrating an upper portion of a terminal unit 830 according to another embodiment of the present invention. FIG. 9 is a cross-sectional view of the terminal unit 830, taken along the line IX-IX.

Referring to FIG. 8, the terminal unit 830 has coupling holes 835 through which the coupling members 181 are inserted, a projection portion 831, and a first burying hole (e.g., a countersink hole) 837 that acts as a separation-resistant structure to prevent or protect the terminal unit 830 from being separated from the insulating frame 220. Also, similar to the terminal unit 230 of FIG. 5, the terminal unit 830 also has a rotation-resistant hole 833 that fixes a position of the terminal unit 830 so as to prevent rotation of the terminal unit 830 when the insulating frame 220 is injection-molded.

However, the terminal unit 830 according to the present embodiment is different from the terminal unit 230 in a shape of the projection portion 831 and a shape of the first burying hole 837. Description of structures that are substantially the same as the aforementioned structures is omitted, and differences therebetween will now be described.

The projection portion 831 may have a repeating saw-toothed pattern, and the projection portion 831 may be formed on three side surfaces of the terminal unit 830. A shape of the saw-toothed pattern of the projection portion 831 may be rectangular as illustrated in FIG. 5 or may have a T-shape as illustrated in FIG. 8. However, the shape of the saw-toothed pattern may be one of various suitable shapes, such as a triangular shape, a hexagonal shape, or the like.

Referring to FIG. 9, the first burying hole 837 may have entirely tapered inclined surfaces 837S. Here, a cross-section of the first burying hole 837 may have a V-shape that becomes wider in an upward direction, so that it is possible to prevent or protect the terminal unit 830 from being separated from the insulating frame 220.

Figure 10:
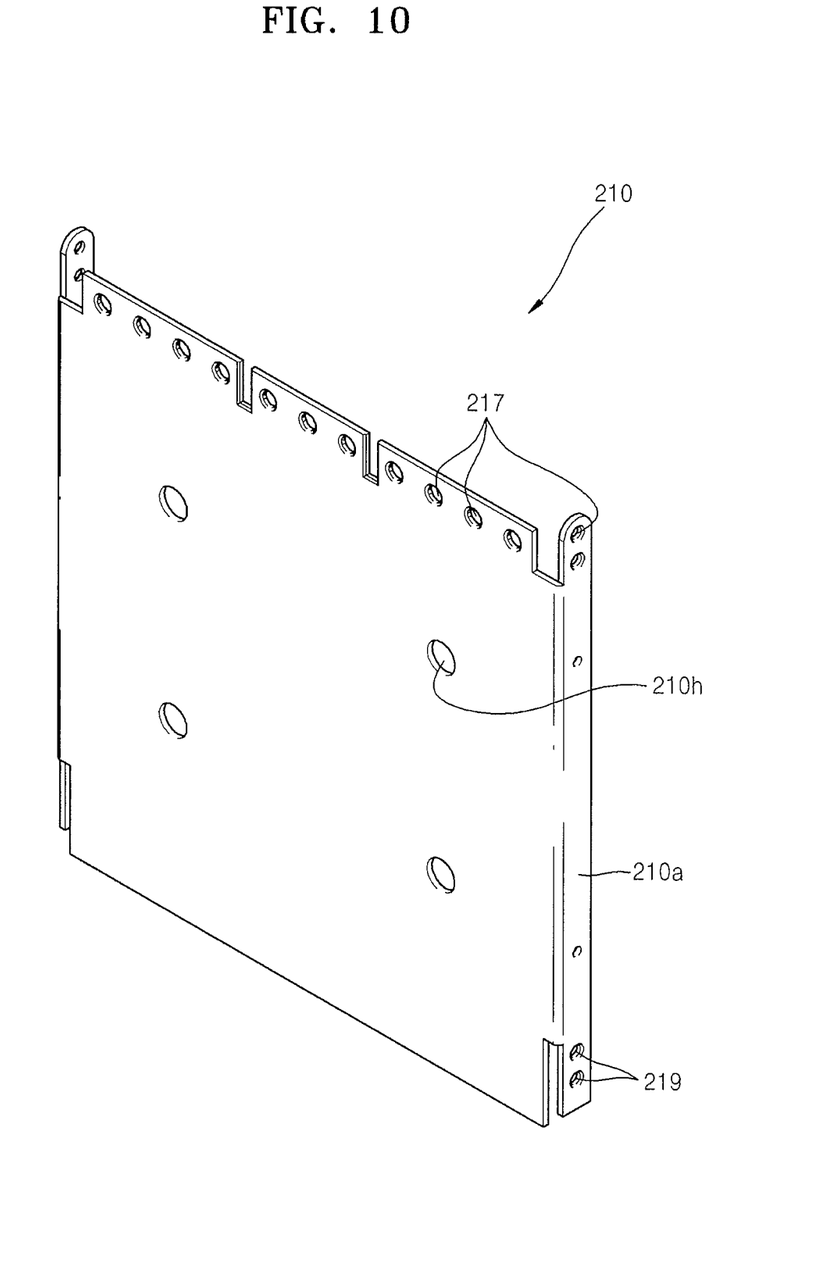
FIG. 10 is a perspective view of a heat radiation unit of the battery pack of FIG. 1.

FIG. 10 is a perspective view of the heat radiation unit 210 of the battery pack 10.

Referring to FIG. 10, in order to integrally form the heat radiation unit 210 with the insulating frame 220, a plurality of second burying holes 217 may be formed in the heat radiation unit 210. The second burying holes 217 are formed in a top portion of the heat radiation unit 210 to increase a coupling strength between the insulating frame 220 and the heat radiation unit 210. When forming the insulating frame 220 via injection molding by using an insulating resin material, the insulating resin material moves through the second burying holes 217 and then is hardened, and the insulating frame 220 is firmly coupled with the heat radiation unit 210 via the second burying holes 217.

For coupling between the spacer 240 and the rib 210a of the heat radiation unit 210, third burying holes 219 may be formed in a lower portion (e.g., an end) of the rib 210a. When the insulating resin material that is injected during an injection molding process of the spacer 240 moves through the third burying holes 219 and is hardened, the spacer 240 is firmly coupled with the rib 210a via the third burying holes 219.

Figure 11:
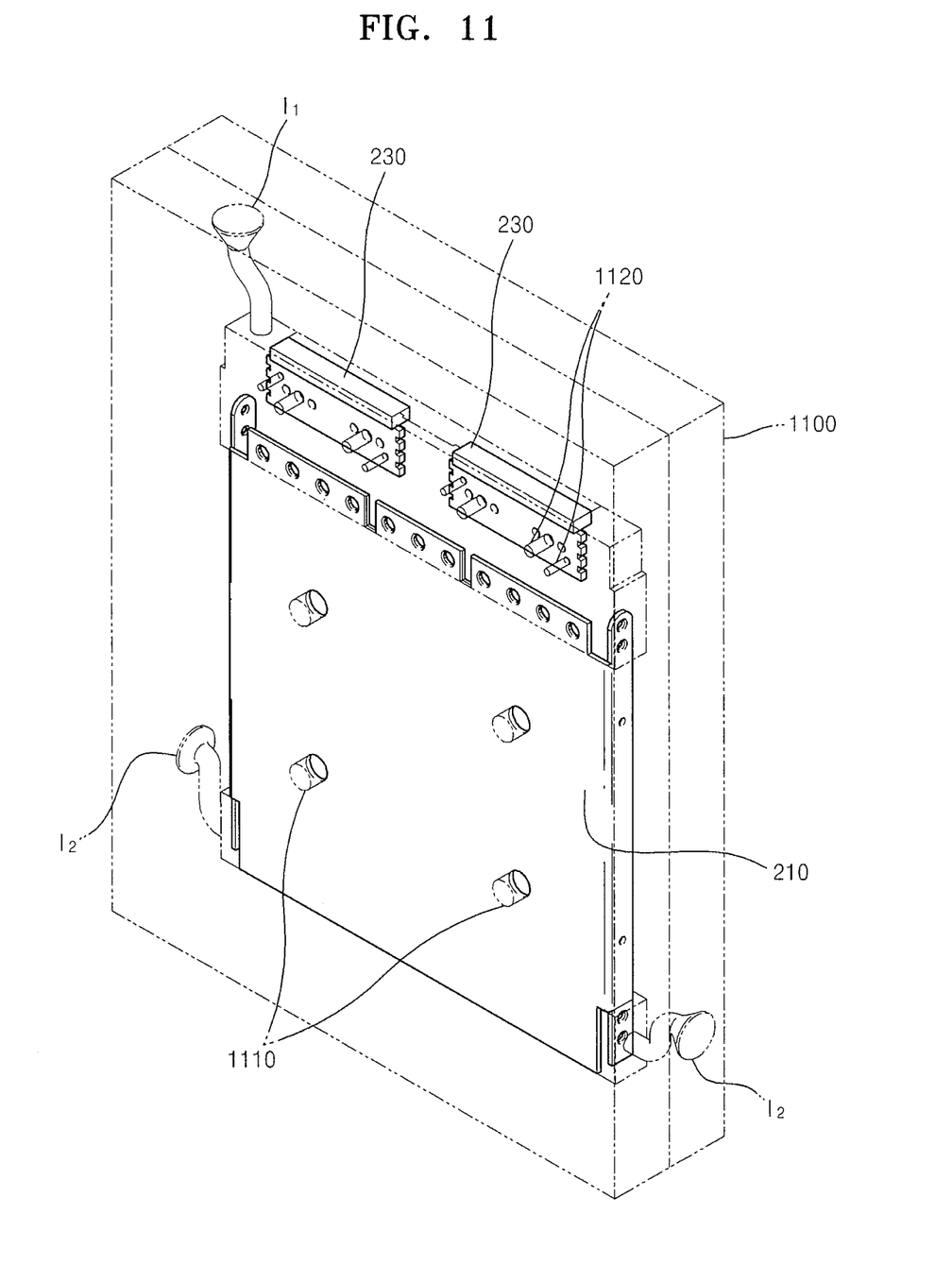
FIG. 11 is a perspective view illustrating a state in which the heat radiation unit of FIG. 10 and the terminal unit of FIG. 5 are disposed in a mold.

FIG. 11 is a perspective view illustrating a state in which the heat radiation unit 210 and the terminal unit 230 are disposed in a mold 1100.

Referring to FIG. 11, the heat radiation unit 210 and the terminal unit 230 are fixed in the mold 1100. In order to fix the heat radiation unit 210 and the terminal unit 230 in place, the mold 1100 may have first and second fixing projections 1110 and 1120.

The first fixing projections 1110 are disposed at positions corresponding to the through holes 210h of the heat radiation unit 210, and have an external diameter equal to a diameter of the through holes 210h. When the first fixing projections 1110 are inserted into the through holes 210h, a position of the heat radiation unit 210 with respect to the mold 1100 is fixed.

The second fixing projections 1120 may be disposed at positions corresponding to the rotation-resistant holes 233 of the terminal unit 230, and may prevent or block rotation of the terminal unit 230 by fixing a position of the terminal unit 230 with respect to the mold 1100. Here, an external diameter of the second fixing projections 1120 is the same as a diameter of the rotation-resistant holes 233.

Also, in order to prevent or block an insulating resin material that is injected into the mold 1100 from filling the coupling holes 235 of the terminal unit 230, the second fixing projections 1120 may be disposed at positions corresponding to the coupling holes 235 of the terminal unit 230.

In this manner, when positions of the heat radiation unit 210 and the terminal unit 230 are fixed, the insulating resin material is injected via inlets arranged in the mold 1100. The insulating resin material is injected via a first inlet $I_1$ to form the insulating frame 220, and the insulating resin material is injected via a second inlet $I_2$ to form the spacer 240.

The insulating resin material injected via the first inlet I1 has a suitable flowability, and thus the insulating resin material fills the first burying hole 237 formed in the terminal unit 230 and grooves formed between the projection portions 231 while moving through the first burying hole 237 and concurrently (e.g., simultaneously) fills the second burying holes 217 formed in the heat radiation unit 210 while moving through the second burying holes 217. Afterward, the insulating frame 220 is completed by a hardening process, and is coupled (or interlocked) with the terminal unit 230 and the heat radiation unit 210.

The insulating resin material injected via the second inlet $I_2$ fills the third burying holes 219 while moving therethrough.

Afterward, the spacer 240 is completed by a hardening process, and is coupled (or interlocked) with the rib 210a of the heat radiation unit 210.

According to one or more embodiments of the present invention, the heat radiation unit 210 and the terminal unit 230 are integrated by the insulating frame 220, so that it is possible to prevent or protect the heat radiation unit 210 or the terminal unit 230 from being separated from the case 200, to diffuse heat generated in the battery cell 100, to prevent a false insertion of the battery cell 100 when the battery cell 100 is disposed on the case 200, and to obtain a space S that accommodates a swelling phenomenon of the battery cell 100. As such, for example, an electric vehicle or a hybrid electric vehicle including a battery pack with the embodied case housing a battery cell is safer to drive.

It should be understood that the exemplary embodiments described therein should be considered in a descriptive sense only and not for purposes of limitation. Descriptions of features or aspects within each embodiment should typically be considered as available for other similar features or aspects in other embodiments.

EXPLANATION OF REFERENCE NUMERALS

| | |
|---|---|
| 10: battery pack | 100: battery cell |
| 120: lead tab | 125: coupling hole |
| 130: conductive plate | 135: coupling hole |
| 140: adhering member | 200: case |
| 210: heat radiation unit | 210h: through hole |
| 217: second burying hole | 219: third burying hole |
| 220: insulating frame | 230, 830: terminal unit |
| 231, 831: projection portion | 233, 833: rotation-resistant hole |
| 235, 835: coupling hole | 237, 837: first burying hole |
| 1100: mold | 1110: first fixing projection |
| 1120: second fixing projection | |

What is claimed is:

1. A case for a battery cell comprising:
    a heat radiation unit;
    a terminal unit separate from the heat radiation unit; and
    an insulating frame interlocked with the heat radiation unit and the terminal unit to form the case,
    wherein the terminal unit is configured to be electrically connected to a lead tab of the battery cell,
    wherein the terminal unit has a hole,
    wherein the hole is spaced from edges of the terminal unit, and
    wherein a part of the insulating frame is within the hole to interlock the insulating frame with the terminal unit.

2. The case as claimed in claim 1, wherein the hole comprises a first portion and a second portion that is narrower than the first portion.

3. The case as claimed in claim 2, wherein a first portion of the part of the insulating frame is within the first portion of the hole and is wider than the second portion of the hole.

4. The case as claimed in claim 3, wherein the insulating frame has a main body, and wherein a second portion of the part of the insulating frame is within the second portion of the hole and is between the main body of the insulating frame and the first portion of the part of the insulating frame which is within the first portion of the hole.

5. The case as claimed in claim 1, wherein a side of the terminal unit comprises a projection portion at least partially received in a receiving portion of the insulating frame.

6. The case as claimed in claim 5, wherein the projection portion has a saw-toothed pattern.

7. The case as claimed in claim 5, wherein a shape of the receiving portion of the insulating frame substantially conforms to the projection portion.

8. The case as claimed in claim 1, wherein a difference in height between the heat radiation unit and the insulating frame forms an open space between the case and another battery case stacked adjacent to the case.

9. The case as claimed in claim 8, wherein the insulating frame has a first height and the heat radiation unit has a second height less than the first height.

10. The case as claimed in claim 1, further comprising an adhering member between the heat radiation unit and the battery cell.

11. The case as claimed in claim 1, wherein the heat radiation unit has a plurality of holes for diffusing heat from the battery cell.

12. The case as claimed in claim 1, wherein the heat radiation unit has a hole, and a part of the insulating frame is within the hole to interlock the heat radiation unit with the insulating frame.

13. The case as claimed in claim 1, further comprising a spacer interlocked with a side of the heat radiation unit opposite another side of the heat radiation unit connected to the insulating frame, wherein the spacer has a first height and the heat radiation unit has a second height less than the first height.

* * * * *